US011808325B2

(12) United States Patent
Wilkes et al.

(10) Patent No.: US 11,808,325 B2
(45) Date of Patent: Nov. 7, 2023

(54) TRAVEL LIMITER FOR A VEHICLE STEERING COLUMN

(71) Applicant: ZF Automotive UK Limited, Solihull (GB)

(72) Inventors: Mark Anthony Wilkes, Birmingham (GB); Russell Wilson-Jones, Stratford upon Avon (GB)

(73) Assignee: ZF Automotive UK Limited

(*) Notice: Subject to any disclaimer, the term of this patent is extended or adjusted under 35 U.S.C. 154(b) by 113 days.

(21) Appl. No.: 17/587,927

(22) Filed: Jan. 28, 2022

(65) Prior Publication Data
US 2022/0243791 A1 Aug. 4, 2022

(30) Foreign Application Priority Data
Jan. 29, 2021 (GB) .................................... 2101303

(51) Int. Cl.
| | | |
|---|---|---|
| F16H 19/02 | (2006.01) | |
| B62D 1/16 | (2006.01) | |
| B62D 5/04 | (2006.01) | |
| F16H 25/20 | (2006.01) | |
| F16D 13/02 | (2006.01) | |
| F16D 13/42 | (2006.01) | |

(52) U.S. Cl.
CPC ............ *F16H 19/02* (2013.01); *B62D 1/16* (2013.01); *B62D 5/043* (2013.01); *B62D 5/046* (2013.01); *B62D 5/0409* (2013.01); *F16H 25/2015* (2013.01); *F16D 13/02* (2013.01); *F16D 13/42* (2013.01)

(58) Field of Classification Search
USPC ........................................................ 192/141
See application file for complete search history.

(56) References Cited

U.S. PATENT DOCUMENTS 2,620,911 A * 12/1952 Krell ...................... F16D 59/00
188/110
3,647,038 A * 3/1972 Balz ..................... F16K 31/048
192/142 R (Continued)

FOREIGN PATENT DOCUMENTS

| CN | 206634059 U | 11/2017 |
|---|---|---|
| JP | 2004243896 A | 9/2004 |

(Continued)

*Primary Examiner* — Timothy Hannon
(74) *Attorney, Agent, or Firm* — Kristin L. Murphy (57) ABSTRACT

A travel limiter for a rotatable steering column of a vehicle comprises: a housing; an elongate threaded member rotatably mounted about its longitudinal axis within the housing; a nut member threadedly mounted on the elongate threaded member, the exterior of the nut member comprising a toothed gear; connector for connection of a rotatable steering column of a vehicle to the elongate threaded member, whereby the steering column and the threaded member are constrained to rotate together; end stops which engage with the nut member to define the maximum axial displacement of the nut member along the elongate threaded member in both directions; a drive motor having an output shaft configured to rotate an output gear member meshed with the gear on the exterior of the nut member; and a controller configured to control the operation of the drive motor.

24 Claims, 6 Drawing Sheets

(56) References Cited

U.S. PATENT DOCUMENTS

| | | | | |
|---|---|---|---|---|
| 4,064,981 A | * | 12/1977 | House | B64C 13/24 |
| | | | | 74/89.37 |
| 4,466,511 A | * | 8/1984 | Garnett | B23Q 11/04 |
| | | | | 188/134 |
| 4,760,907 A | * | 8/1988 | Avny | F16H 25/2015 |
| | | | | 74/57 |
| 6,761,080 B2 | * | 7/2004 | Lange | F16H 25/2015 |
| | | | | 74/424.81 |
| 6,817,437 B2 | * | 11/2004 | Magnus | B62D 5/006 |
| | | | | 180/443 |
| 2006/0162987 A1 | | 7/2006 | Hagl | |
| 2013/0292201 A1 | * | 11/2013 | Yamanaka | B62D 5/0448 |
| | | | | 180/402 |
| 2017/0320515 A1 | | 11/2017 | Levesque et al. | |
| 2018/0238377 A1 | | 8/2018 | Kim et al. | |

FOREIGN PATENT DOCUMENTS

| | | |
|---|---|---|
| JP | 2004249934 A | 9/2004 |
| JP | 2019151152 A | 9/2019 |
| KR | 20060072714 A | 6/2006 |

* cited by examiner

TRAVEL LIMITER FOR A VEHICLE STEERING COLUMN

This application claims priority to UK Patent Application No. 2101303.2, filed Jan. 29, 2021, the disclosure of which is incorporated herein by reference in its entirety.

TECHNICAL FIELD

The present disclosure relates to travel limiters for vehicle steering column assemblies and in particular, but not exclusively, to travel limiters for vehicle steering column assemblies for autonomous vehicles.

BACKGROUND

Autonomous vehicles are intended to be used primarily in autonomous mode, in which control of the vehicle is carried out without manual intervention. However, it is desirable for autonomous vehicles to be controllable manually if necessary or desired, and for that reason vehicle controls such as a steering wheel (typically having a "steer-by-wire" operation) must be provided.

In such steer-by-wire arrangements, a hand wheel (steering wheel) is connected to one end of a shaft was angular displacement is measured to generate a signal which is used to control the orientation of the steered wheels of the vehicle.

One problem which occurs with such steer-by-wire arrangements arises from the fact that the vehicle wheels are not physically connected to the steering wheel, in contrast to a conventional mechanical steering arrangement. The steered wheels can only pivot through a given range of motion, and it is therefore important to limit the maximum rotation of the steering wheel so that it corresponds to the maximum extent of pivoting of the steered wheels; otherwise the driver of the vehicle would be able to rotate the steering wheel indefinitely when the steered wheels are at their maximum steering angle.

One known travel limiter for a vehicle steering column comprises an elongate threaded shaft (commonly referred to as a leadscrew) which is connected at one end to, and rotates with, the steering column. A nut is threaded onto the threaded shaft and is constrained to be non-rotatable, such that rotation of the shaft causes the nut to be displaced along the threaded shaft. Two end stops, one located at each end of the threaded shaft, limit the travel of the nut in each direction and thereby limit the maximum rotation of the steering column in each direction. The maximum rotation of the steering column in each direction is determined by length of the threaded shaft and the position of the end stops.

SUMMARY

In accordance with the present disclosure, a travel limiter for a rotatable steering column of a vehicle comprises:
   a housing;
   an elongate threaded member rotatably mounted about its longitudinal axis within the housing;
   a nut member threadedly mounted on the elongate threaded member, the exterior of the nut member comprising a toothed gear;
   a connector for connection of a rotatable steering column of a vehicle to the elongate threaded member, whereby the steering column and the threaded member are constrained to rotate together;
   end stops which engage with the nut member to define the maximum axial displacement of the nut member along the elongate threaded member in both directions;
   a drive motor having an output shaft configured to rotate an output gear member meshed with the gear on the exterior of the nut member; and
   a controller that controls the operation of the drive motor.

When restriction of the rotation of the vehicle steering column is not required, the drive motor is controlled to rotate the nut member at the same speed as the elongate threaded member (which, in use, rotates with the vehicle steering column) such that the axial position of the nut member does not change.

When travel limiting is required, the motor is stopped, with the result that further rotation of the elongate threaded member (commonly known as a leadscrew) by the vehicle steering column displaces the nut member along the elongate threaded member and eventually into contact with one of the end stops, which prevents further rotation of the elongate threaded member and of the vehicle steering column to which it is connected.

The use of a nut member which is rotated at the same speed of the leadscrew until travel limiting is required allows a much shorter leadscrew to be used which significantly reduces the physical size of the travel limiter.

In one exemplary arrangement, the end stops comprise a clutch or brake.

The use of a clutch or brake as the end stop provides a good steering feel and progressive engagement to the final end stop position.

In one exemplary arrangement, each clutch or brake comprises a plurality of plates.

In one exemplary arrangement, each clutch or brake comprises a first plate mounted on a first plate carrier located within the housing, the first plate being engageable with a second plate mounted on a second plate carrier configured to rotate with the elongate threaded member.

Each clutch or brake comprises a plurality of plates mounted on the first plate carrier which and a plurality of plates mounted on the second plate carrier, the plates on the first and second carriers being interleaved.

In one exemplary arrangement, the first plate carriers of the clutch or brake are displaceable with respect to the housing.

This arrangement allows disengagement of the clutch or brake from the end stop position.

In one exemplary arrangement, the first plate carriers of the clutch or brake are displaceable with respect to the housing in a direction parallel to the longitudinal axis of the elongate threaded member.

In one exemplary arrangement, the travel limiter further comprises a biasing element for biasing the first plate carriers of the clutch or brake away from each other.

The biasing element may comprise one or more springs for biasing the first plate carriers of the clutch or brake away from each other.

In one exemplary arrangement, the travel limiter further comprises a ratchet arrangement which permits rotation of each of the first plate carriers with respect to the housing in one direction and which inhibits rotation of each of the first plate carriers with respect to the housing in the opposite direction.

For example, each of the first plate carriers may comprise a plurality of ratchet teeth engaged with ratchet teeth which are fixed with respect to the housing.

Alternatively, the travel limiter may further comprise an engagement arrangement which permits rotation of each of the first plate carriers with respect to the housing through a predetermined angle.

The engagement arrangement may comprise a projection engaged in a slot.

For example, the engagement arrangement may comprise a plurality of projections fixed with respect to the housing, each of which is received in a respective slot in one of the first plate carriers.

In one exemplary arrangement, the teeth of the gear on the exterior of the nut member are straight cut and are aligned with the longitudinal axis of the elongate threaded member.

This allows the nut member to move longitudinally along the leadscrew when the leadscrew is stationary (i.e. when the drive motor is not actuated).

In one exemplary arrangement, the output gear member rotated by the drive motor comprises a worm screw.

In one exemplary arrangement, the rotational axis of the worm screw is inclined respect to the teeth of the gear on the exterior of the nut member by substantially the same angle as the helix angle of the worm screw.

The engagement of the output gear member with the gear on the exterior of the nut member may be non-reversible or reversible.

In one exemplary arrangement, the travel limiter may further comprise first and second spring member, which apply a longitudinal force on the nut member in opposite directions to each other.

In one exemplary arrangement, the first and second spring members comprise helical springs through which the elongate threaded member passes.

The elongate threaded member may be tubular.

The tubular threaded member may comprise a key for engagement with a complementarily-shaped portion of the steering column.

The key may comprise an internally splined portion for engagement with a complementarily splined portion of the steering column.

The present disclosure also includes a steering column assembly comprising a travel limiter in accordance with the present disclosure.

BRIEF DESCRIPTION OF THE DRAWINGS

By way of example only, specific exemplary arrangements of the present disclosure will now be described with reference to the accompanying drawings, in which.

DETAILED DESCRIPTION

Figure 1:
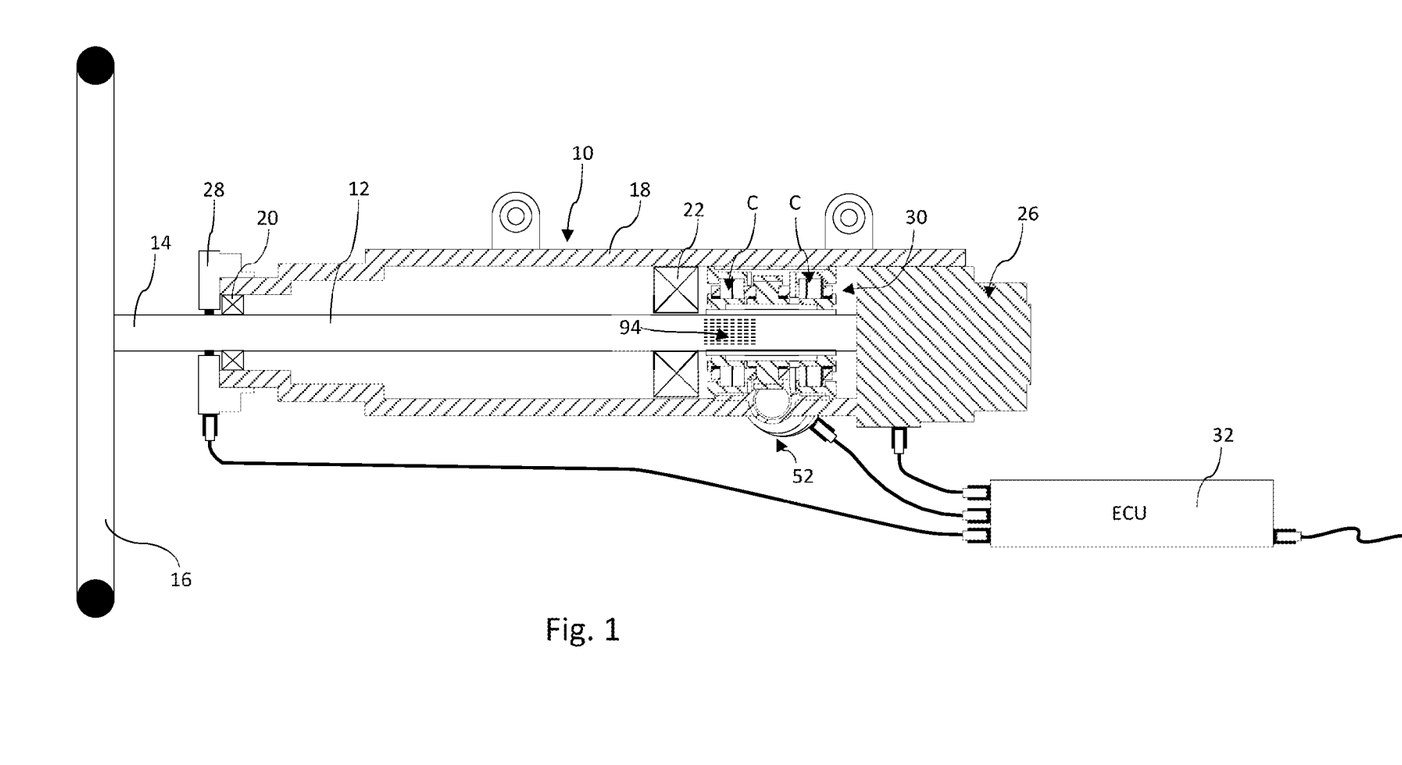
FIG. 1 is a schematic illustration of an exemplary arrangement of a steering column assembly, fitted with a travel limiter in accordance with the present disclosure.

Referring firstly to FIG. 1, a steering column assembly 10 for a vehicle comprises an elongate rigid steering column 12 to one end 14 of which a steering wheel 16 is connected in use. The steering column 12 is rotatably mounted within an elongate tubular steering column housing 18 by two spaced apart sets of bearings 20, 22 within the housing 18. A torque feedback motor and associated gearing 26 are mounted on inner end of the housing 18 and are connected to the inner end of the steering column 12. If the steering column is also supported by a feedback motor 26, it may be possible to omit the second set of bearings 22. At the opposite (outer) end of the housing 18 a conventional sensor 28 is mounted to measure the rotation of the steering column 12. A travel limiter 30 for the steering column, in accordance with the present disclosure, is mounted within the housing 18 adjacent to the torque feedback motor 26.

The torque feedback motor 26, the steering column rotation sensor 28 and the travel limiter 30 are electrically connected to an electronic control unit (ECU) 32 which receives signals from the sensor 28 and controls the operation of the torque feedback motor 26 and the travel limiter 30.

The travel limiter 30 is illustrated in more detail in FIGS. 2 to 8. The travel limiter 30 comprises an external tubular, generally cylindrical, metal housing 40 and two retaining annuli 42, 44 located one at each end of the tubular housing 40. In one exemplary arrangement, the annuli 42, 44 are secured to the housing by three identical bolts 46 each of which passes through an aperture in one of three radially extending lugs 48 which are equally angularly spaced around the periphery of the annuli 42, 44. In one exemplary arrangement, each of the bolts 46 is threadedly received in a complementarily-threaded recess in one of three radially-projecting bosses 49 at each end of the housing 40 which are equally angularly spaced around the periphery of the housing 40. The housing 40 is also provided with three identical elongate tubular bosses 50 equally angularly spaced around the periphery of the housing adjacent to a respective pair of longitudinally-spaced bosses 49, and extending along the whole length of the housing in a direction parallel to the longitudinal axis A-A of the housing 18, each for receipt of a biasing spring 66, as will be explained.

Figure 2:
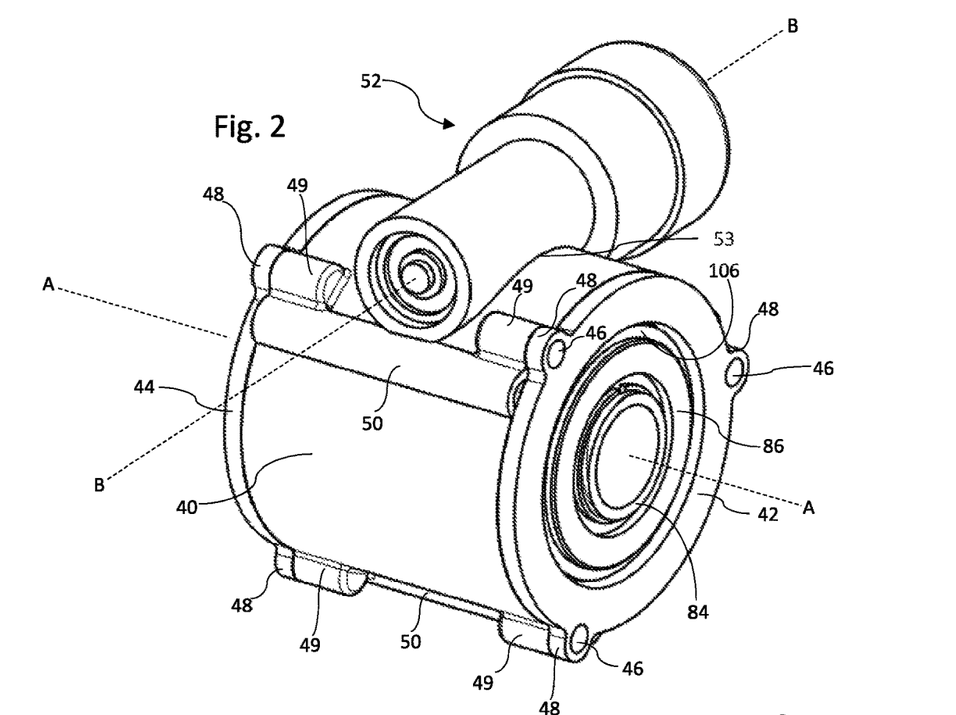
FIG. 2 is a perspective view of the travel limiter of FIG. 1.
Figure 3:
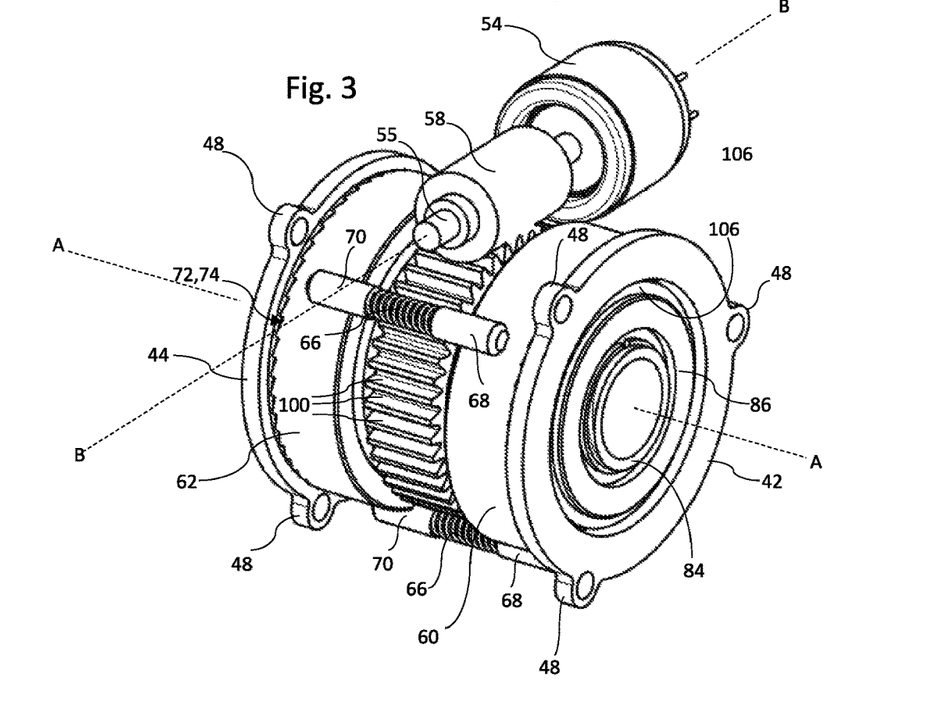
FIG. 3 is a perspective view of the travel limiter shown in FIG. 2, shown with its outer housing removed.
Figure 4:
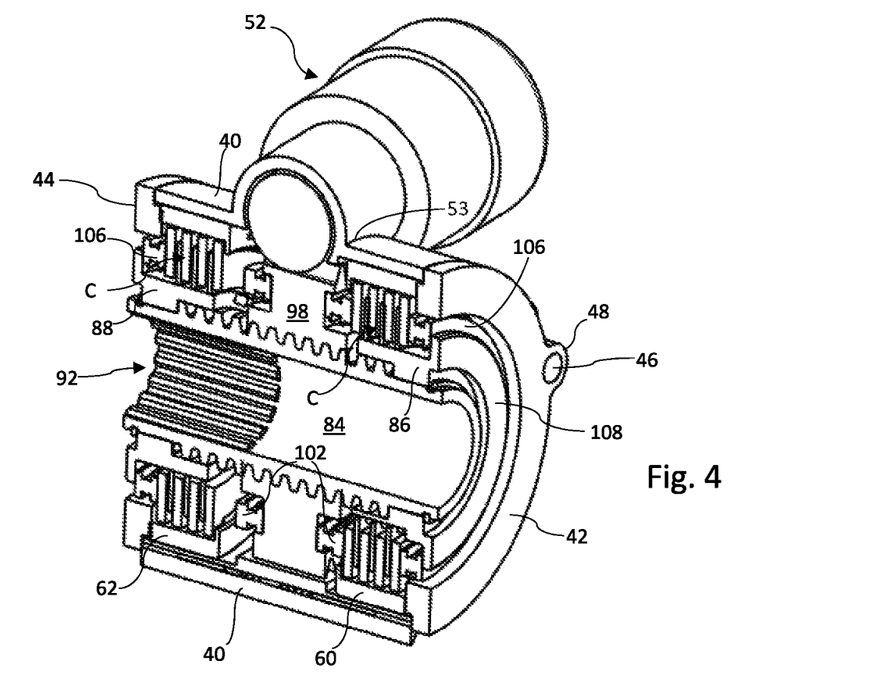
FIG. 4 is a vertical, longitudinal cross-sectional perspective view of the travel limiter shown in FIG. 2.

A worm drive motor assembly 52 is fixedly mounted in a recess 53 of the housing 40 and houses a worm drive motor 54 which in turn drives an output shaft 55 mounted on two sets of bearings 57 for rotation about an axis B-B and which carries a worm 58, as will be explained.

Figure 5:
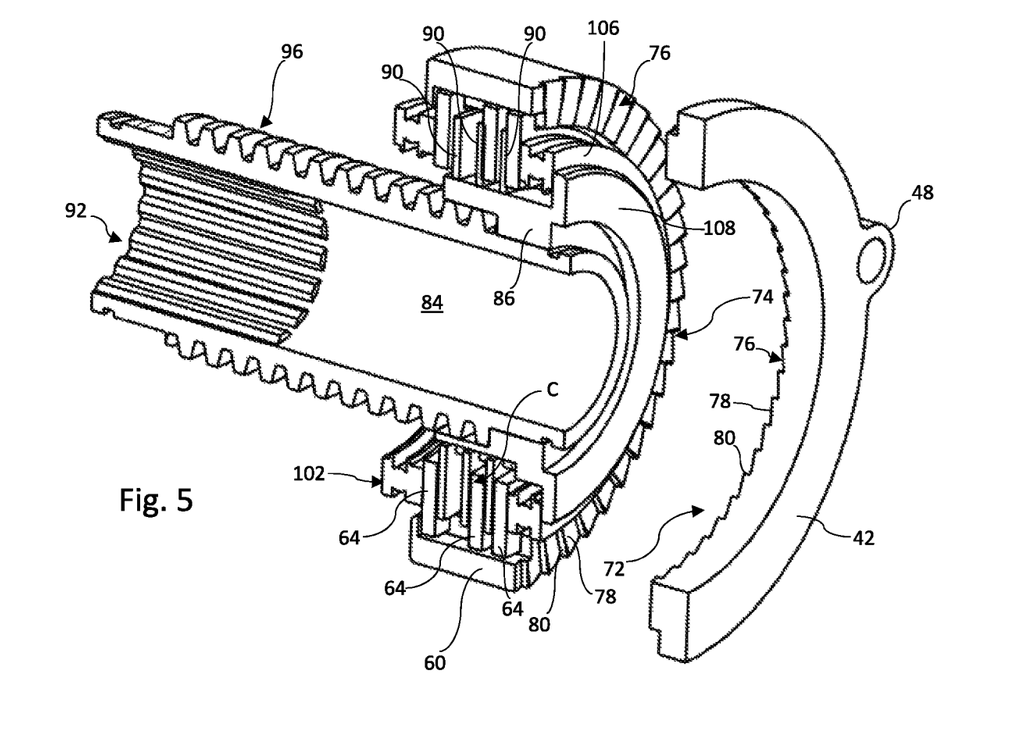
FIG. 5 is an exploded perspective view of a first end portion of the travel limiter of FIG. 2.
Figures 6, 7:
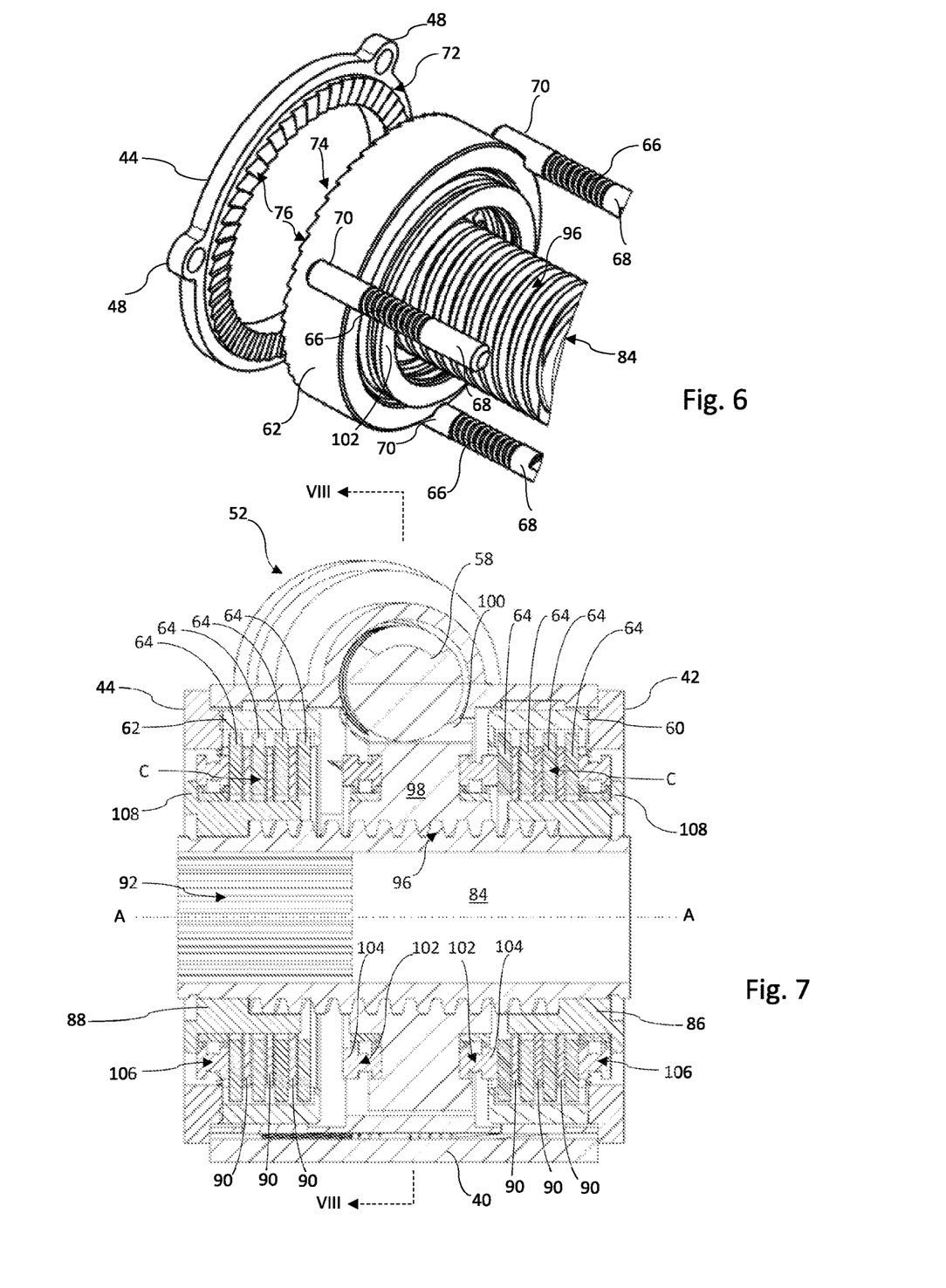
FIG. 6 is an exploded perspective view of a second end portion of the travel limiter of FIG. 2.
FIG. 7 is a vertical, longitudinal cross-section of the travel limiter shown in FIG. 2.
Figure 8:
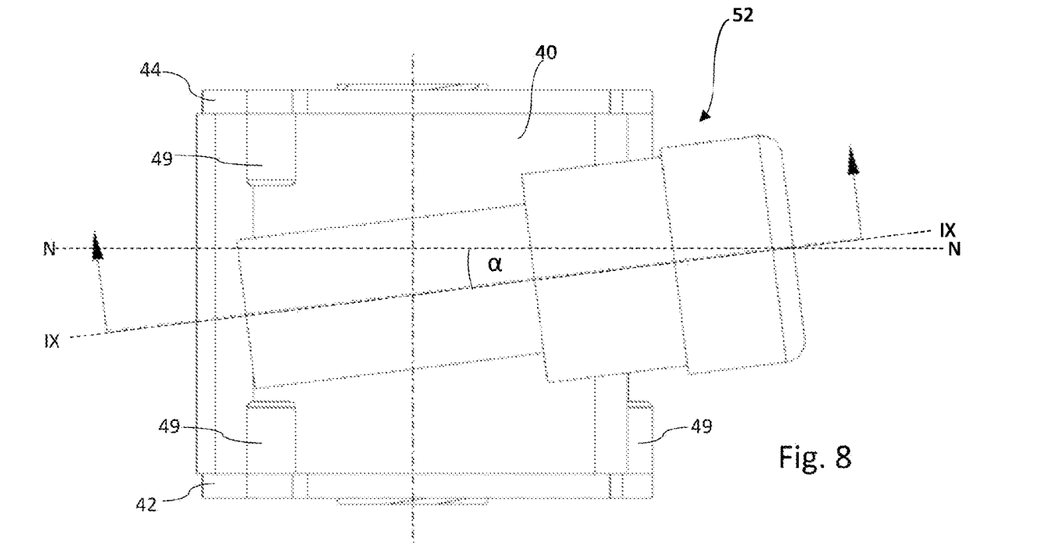
FIG. 8 plan view of the travel limiter shown in FIG. 2.

In one exemplary arrangement, two identical brake or clutch assemblies (hereafter referred to as "clutches") C are mounted within the housing 14, one at each end and which form two end stops, as will be explained. As best seen in FIGS. 4 to 8, each clutch C comprises one of two identical clutch plate carriers 60, 62, each of which carries four identical annular clutch plates 64. As best seen in FIGS. 3 and 6, a longitudinally outer end face of each of the clutch plate carriers 60, 62 is urged towards engagement with the inner face of the respective retaining annulus 42, 44 by compression springs 66 extending in a direction parallel to the longitudinal axis of the housing between locating lugs 68, 70 on the clutch plate carriers 60, 62. In one exemplary arrangement, there are three identical compression springs 66. Each of the compression springs 66 and its associated locating lugs 68, 70 is housed within a respective one of the elongate tubular bosses 50 projecting radially from the housing 40. However, as best seen in FIGS. 5 and 6, engaging faces of the clutch plate carriers 60, 62 and the annuli 42, 44 are not planar but instead are provided with complementarily-shaped inter-engaging saw-toothed ratchet formations 72, 74 formed from forty-eight identical, adjacent saw teeth 76, each having a shallow "dip" slope face 78 and a steep "scarp" slope face 80. The ratchet formations prevent rotation of the clutch plate carriers 60, 62 in one direction by engagement of the faces 80 with the corresponding faces 80 of the associated annulus 42, 44. However, limited relative rotation of up to 7.5° in the opposite direction is possible, by sliding of the shallow faces 78 against one another, such limited relative rotation being accommodated by inward longitudinal movement of the clutch plate carriers 60, 62 against the restoring force of the springs 66.

A cylindrical tube 84 passes longitudinally through, and coaxially with, the housing 48. Two further clutch plate carriers 86, 88, which form part of the respective clutch assembly C, are mounted one at either end of the cylindrical tube 84 and are constrained to rotate with it. The further clutch plate carriers 86, 88 are identical and each carries three identical clutch plates 90, each of which plates 90 is positioned between two clutch plates 64 of the clutch plate carriers 60, 62, whereby the plates on the two carriers are interleaved. The steering column 12 (not shown in FIGS. 2 to 8) passes through the tube 84 as shown in FIG. 1, and an end of the tube 84 nearer the steering wheel 16 is internally splined, as shown at 92, to form a keying engagement with a complementarily-shaped externally splined portion 94 of the steering column 12 (see FIG. 1), so that the steering column 12 and the tube 84 are keyed, and rotate, together.

The exterior of the portion of the tube 84 between the further clutch plate carriers 86, 88 is externally threaded as shown at 96 and forms a leadscrew on which an internally threaded nut 98 is threadedly disposed. As will be explained, rotation of the nut 98 with respect to the leadscrew 96 causes the nut to be displaced along it, the maximum displacement in either direction being limited by engagement of the nut 98 with one of the end stops formed by the clutches C.

The exterior of the nut 98 is provided with straight-cut teeth 100 around its periphery which engage with the worm 58 of the worm drive motor 56. The rotational axis of the worm 58 is inclined with respect to the teeth 100 of the nut 98 by the same angle as the helix angle of the worm (i.e. angle α between the rotational axis B-B of the worm 58 and the transverse direction N-N of the housing 40 when viewed from above the motor—see FIG. 8). This allows the teeth 100 of the nut 98 to be straight-cut so that it can move linearly along the leadscrew.

A thrust bearing 102 and associated thrust plate 104 is mounted on each of the end faces of the nut 98, each thrust bearing being engaged with the inner plate 64 of one of the clutch plate carriers 60, 62 when the nut 98 is displaced along the leadscrew 96 to its maximum extent in either direction, as will be explained. Thrust bearings 106 are also mounted between a peripheral flange 108 at the longitudinally outer end of each of the further clutch plate carriers 86, 88, and the longitudinally outermost clutch plate 64 of the respective clutch plate carrier 60, 62.

As the steering column 12 is rotated by a driver turning the steering wheel 16, the tube 84 is also rotated, as is the leadscrew 96 which forms part of the exterior of the tube 84.

The axial movement of the nut 98 along the leadscrew 96 depends on the difference in rotational displacement between the steering column 12 and the nut 98 (as determined by the worm drive motor 56). The rotation of the steering column 12 is measured by the steering column rotation sensor 28 which generates a signal which is a function of rotation which is fed to the ECU 32. If the rotation of the steering column 12 does not need to be limited (as determined by the ECU 32), the electric motor 56 is actuated by the ECU 32 to rotate the worm 58 which in turn rotates the nut 98 by the same amount as the steering column 12 (and the leadscrew 96 which rotates with the steering column 12), in which case the axial/longitudinal position of the nut 98 does not change. On the other hand, if the ECU 32 determines that limiting of the rotation of the steering column 12 is required, the motor 56 is stopped which in turn stops the nut 96 from rotating (and indeed since the electric motor is non-reversible prevents rotation of the nut 98 on the leadscrew 96 in either direction). Rotation of the steering column 12, and the leadscrew 96 which is constrained to rotate with it, thereby results in axial/longitudinal displacement of the nut 98 along the leadscrew 96, the direction of displacement depending on the direction of rotation of the steering column 12. The straight-cut teeth 100 of the nut 98, and the inclination of the rotational axis of the worm 58 by the same angle as its helix angle, allows the nut 98 to move longitudinally with respect to the worm.

As the nut 98 is displaced axially/longitudinally along the leadscrew 96 to its maximum extent in either direction, the thrust plate 104 of one of the thrust bearings 102 mounted on the nut 98 will engage with the axially innermost plate 64 of one of the clutch plate carriers 60, 62 (depending on the direction of displacement of the nut 98). The thrust bearing 102 and the thrust bearing 106 abutting the axially outermost clutch plate 64 of the clutch plate carrier 60, 62 (depending on the direction of displacement of the nut 98) transmit axial force from the nut 98 into the clutch plates 64 of the clutch plate bearings 60, 62 and the clutch plates 90 of the further clutch plate bearings 86, 88, thereby progressively squeezing the plates 64, 90 together and transmitting torque into the housing 40, thereby braking the leadscrew 96 and limiting the maximum angular displacement of the leadscrew 96, and of the steering column 12 which is constrained to rotate with it.

When the steering column 12 and leadscrew 96 are locked by one of the clutch assemblies, and it is desired to rotate them in the opposite (unlocking) direction the interengaging saw-toothed ratchet formations 72, 74 on the abutting faces of the relevant clutch plate bearing 60, 62 and the associated locking annulus 42, 44 permit rotation of the relevant clutch plate bearing 60, 62 with respect to its associated locking annulus 42, 44 through a small angle (in one exemplary arrangement, approximately 7.5° for each tooth), which causes the locked clutch plate 60, 62 to move longitudinally through a short distance against the restoring force of springs 66, which is sufficient to release the previously locked clutch and allow further rotation of the steering column 12 and leadscrew 96 in the unlocking direction. The angle of the ratchet formations 72, 74 is selected so that they can not resist an angular movement of the shaft 84 (and leadscrew 96) when the torque applied to the shaft 84 (and leadscrew 96) acts to move away from the endstop (the clutch C).

When the system is de-powered, the drive motor 52 is stationary but the transmission is non-reversible, with the result that any attempt to rotate the steering column 12 and leadscrew 96 will move the nut 98 into contact with one of the clutches, which will constrain the rotation of the steering column 12 and the steering wheel 16 connected to it.

Figure 9:
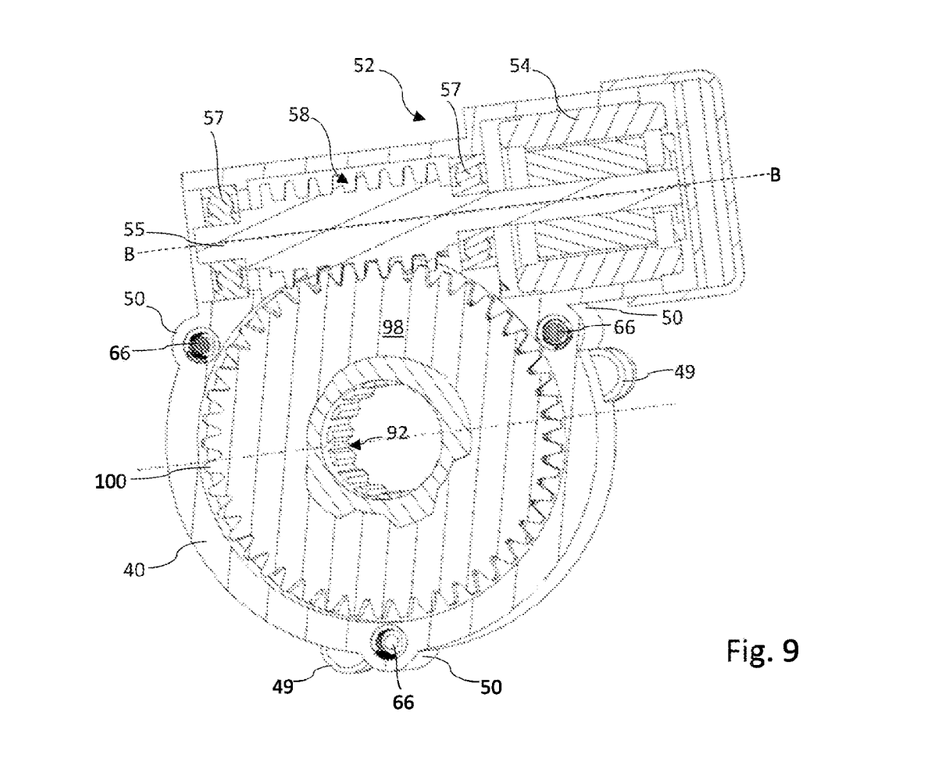
FIG. 9 is a vertical, transverse cross-section through the travel limiter of FIG. 2, looking in the direction of arrows IX-IX of FIG. 8.
Figure 10:
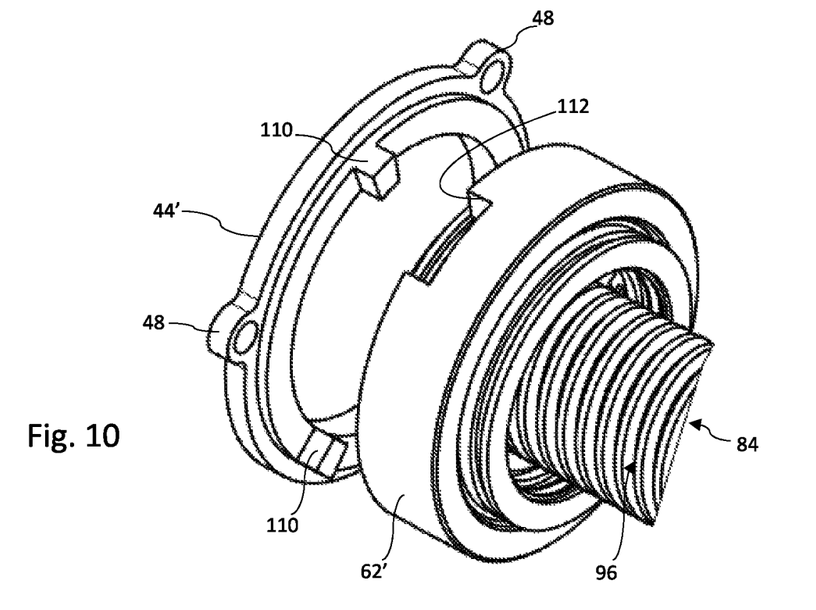
FIG. 10 is an exploded perspective view of a first modification of the travel limiter of FIG. 2.

A first modification to the first exemplary arrangement is illustrated in FIG. 19. The construction is the same as that of the first exemplary arrangement, with the exception of the modification to be described, and the same reference numerals relate to the same features (with the addition of a prime C) where a feature has been modified). In this modification, the ratchet formations 72, 74 are omitted. Instead, the inner face of each of the locking annuli 42', 44' is provided with three identical lugs 110 equally angularly spaced around the periphery. Each lug 110 is received in a respective one of three associated recesses 112 (only one of which is visible in FIG. 9) equally angularly spaced around the periphery of the end face of each clutch plate carrier 60, 62. It will be observed that the circumferential length of each recess 112 is greater than the width of the lugs 110, which permits a limited degree of rotation of the clutch plate carriers 60, 62 with respect to the associated locking annulus 42', 44'.

Consequently, when the steering column 12 and leadscrew 96 are locked by one of the clutch assemblies and it is desired to rotate them in the opposite (unlocking) direction, the limited rotational displacement of the locked clutch plate carrier 60, 62 with respect to its associated annulus 42', 44' is sufficient to release the clutch and allow further rotation of the steering column 12 and leadscrew 96 in the unlocking direction. Only one end of the modified travel limiter is shown in FIG. 10, but the same features are present at the opposite end.

Figure 11:
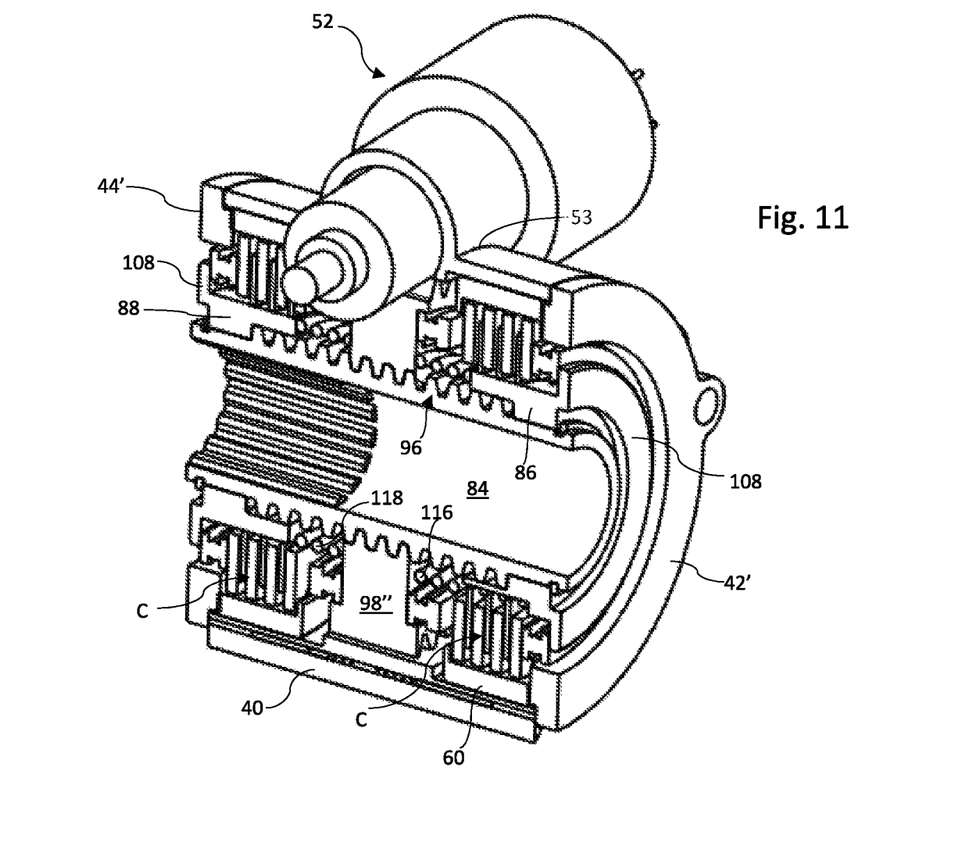
FIG. 11 is an exploded perspective view of a second modification of the travel limiter of FIG. 2.

A second modification the first exemplary arrangement is illustrated in FIG. 11. The construction is the same as that of the second exemplary arrangement, with the exception of the modification to be described, and the same reference numerals relate to the same features (with the addition of a double prime (") where a feature has been modified). In this modification, two identical compression springs 116, 118 are located around the exterior of the lead screw 96 and each is in contact with the inner face of one of the further clutch plate bearings 86, 88 mounted on the leadscrew 96 and with the adjacent face of the nut 98" which is threadedly mounted on the lead screw 96.

In this modification, the nut 98" is designed to be reversible on the leadscrew 96. As for the first exemplary arrangement, if limiting rotation is not required, then the motor 54 is operated to rotate the nut 98" at the same speed and through the same angle as the steering column 12 and leadscrew 96. However, when it is desired to limit the rotation of the steering column 12, the motor 54 does not rotate the nut 98", such that further rotation of the steering column 12 and leadscrew 96 displaces the nut 98" longitudinally along the leadscrew 96. This produces a torque as the nut 98" moves axially against one of the springs 116, 118 (depending on the direction of displacement of the nut 98"). This produces a self-centering torque on the leadscrew 96, and thereby to the steering column 12 and steering wheel 16 and produces a monotonically increasing torque in the distance between a null (linear) position and the point at which the nut 98" engages one of the clutches.

By moving the nut 98", the null angle of the self-centering torque can be varied by operation of the motor 54, and the amount of self-centering torque can be varied by controlling the motor to stop this gives a variable amount of driver feedback torque up to the point at which one of the clutches is engaged and further rotation is prevented.

The disclosure is not restricted to the detail of the foregoing arrangements.

For example, in the arrangements shown in FIGS. 1 to 9 and 10 (in which the transmission is non-reversible) the clutch may additionally be released by rotating the nut 98 by the operation of the motor 54.

The invention claimed is:

1. A travel limiter for a rotatable steering column of a vehicle, comprising:
   a housing;
   an elongate threaded member rotatably mounted about its longitudinal axis within the housing;
   a nut member threadedly mounted on the elongate threaded member, an exterior of the nut member comprising a toothed gear;
   a connector for connection of the rotatable steering column of the vehicle to the elongate threaded member, whereby the steering column and the threaded member are constrained to rotate together;
   end stops which engage with the nut member to define a maximum axial displacement of the nut member along the elongate threaded member in both directions;
   a drive motor having an output shaft configured to rotate an output gear member meshed with the gear on the exterior of the nut member; and
   a controller that operates to control the operation of the drive motor.

2. The travel limiter as claimed in claim 1, wherein the end stops comprise a clutch or brake.

3. The travel limiter as claimed in claim 2, wherein each clutch or brake comprises a plurality of plates.

4. The travel limiter as claimed in claim 2, wherein each clutch or brake comprises a first plate mounted on a first plate carrier located within the housing, the first plate being engageable with a second plate mounted on a second plate carrier configured to rotate with the elongate threaded member.

5. The travel limiter as claimed in claim 2, wherein each clutch or brake comprises a plurality of plates mounted on the first plate carrier and a plurality of plates mounted on the second plate carrier, the plates on the first and second carriers being interleaved.

6. The travel limiter as claimed in claim 4, wherein the first plate carriers of the clutch or brake are displaceable with respect to the housing.

7. The travel limiter as claimed in claim 6, wherein the first plate carriers of the clutch or brake are displaceable with respect to the housing in a direction parallel to the longitudinal axis of the elongate threaded member.

8. The travel limiter as claimed in claim 7, comprising a biasing arrangement for biasing the first plate carriers of the clutch or brake away from each other.

9. The travel limiter as claimed in claim 8, wherein the biasing arrangement comprises one or more springs for biasing the first plate carriers of the clutch or brake away from each other.

10. The travel limiter as claimed in claim 4, further comprising a ratchet arrangement which permits rotation of each of the first plate carriers with respect to the housing in one direction and which inhibits rotation of each of the first plate carriers with respect to the housing in the opposite direction.

11. The travel limiter as claimed in claim 10, wherein each of the first plate carriers comprises a plurality of ratchet teeth engaged with ratchet teeth which are fixed with respect to the housing.

12. The travel limiter as claimed in claim 1, further comprising an engagement mechanism which permits rotation of each of the first plate carriers with respect to the housing through a predetermined angle.

13. The travel limiter as claimed in claim 12, wherein the engagement mechanism comprises a projection engaged in a slot.

14. The travel limiter as claimed in claim 12, wherein the engagement mechanism comprises a plurality of projections fixed with respect to the housing, each of which is received in a respective slot in one of the first plate carriers.

15. The travel limiter as claimed in claim 1, wherein the teeth of the gear on the exterior of the nut member are straight cut and are aligned with the longitudinal axis of the elongate threaded member.

16. The travel limiter as claimed in claim 15, wherein the output gear member rotated by the drive motor comprises a worm screw.

17. The travel limiter as claimed in claim 16, wherein a rotational axis of the worm screw is inclined respect to the teeth of the gear on the exterior of the nut member by the same angle as a helix angle of the worm screw.

18. The travel limiter as claimed in claim 1, wherein the engagement of the output gear member with the gear on the exterior of the nut member is non-reversible.

19. The travel limiter as claimed in claim 1, wherein the engagement of the output gear member with the gear on the exterior of the nut member is reversible.

20. The travel limiter as claimed in claim 1, further comprising a first and second spring, which apply a longitudinal force on the nut member in opposite directions to each other.

21. The travel limiter as claimed in claim 20, wherein the first and second spring comprise helical springs through which the elongate threaded member passes.

22. The travel limiter as claimed in claim 1, wherein the elongate threaded member is tubular.

23. The travel limiter as claimed in claim 22, wherein the tubular threaded member comprises a key for engagement with a complementarily-shaped portion of the steering column.

24. The travel limiter as claimed in claim 23, wherein the tubular threaded member comprises an internally splined portion for engagement with a complementarily splined portion of the steering column.

* * * * *